United States Patent
Lu

(10) Patent No.: US 11,446,821 B2
(45) Date of Patent: Sep. 20, 2022

(54) METHOD AND DEVICE FOR DETERMINING DRIVING ROUTE OF SORTING ROBOT

(71) Applicant: Beijing Jingdong Qianshi Technology Co., Ltd., Beijing (CN)

(72) Inventor: Jie Lu, Beijing (CN)

(73) Assignee: Beijing Jingdong Qianshi Technology Co., Ltd., Beijing (CN)

(*) Notice: Subject to any disclaimer, the term of this patent is extended or adjusted under 35 U.S.C. 154(b) by 379 days.

(21) Appl. No.: 16/497,172

(22) PCT Filed: Apr. 9, 2018

(86) PCT No.: PCT/CN2018/082284
§ 371 (c)(1),
(2) Date: Jan. 3, 2020

(87) PCT Pub. No.: WO2018/205784
PCT Pub. Date: Nov. 15, 2018

(65) Prior Publication Data
US 2022/0088779 A1     Mar. 24, 2022

(30) Foreign Application Priority Data
May 9, 2017   (CN) .......................... 201710321486.2

(51) Int. Cl.
*B25J 9/16*     (2006.01)
*B25J 11/00*    (2006.01)
(Continued)

(52) U.S. Cl.
CPC ........... *B25J 9/1664* (2013.01); *B25J 9/1661* (2013.01); *B25J 11/008* (2013.01);
(Continued)

(58) Field of Classification Search
CPC ...... B25J 9/1664; B25J 9/1661; B25J 11/008; G05D 1/0088; G05D 1/0217; G05D 2201/0216; G06Q 10/06; G06Q 10/08
See application file for complete search history.

(56) References Cited

U.S. PATENT DOCUMENTS

2007/0293978 A1      12/2007  Wurman et al.
2013/0317642 A1*     11/2013  Asaria ................... G06Q 10/08
                                                               700/216
2018/0075402 A1*      3/2018  Stadie .................. G05D 1/0297

FOREIGN PATENT DOCUMENTS

JP        2016119040 A  *  6/2016
WO   WO-2010039702 A1  *  4/2010  ............. G06Q 50/28

OTHER PUBLICATIONS

Search Report pertaining to International Application No. PCT/CN2018/082284 dated Jun. 19, 2018.
(Continued)

*Primary Examiner* — Nicholas Kiswanto
*Assistant Examiner* — Dylan Brandon Mooney
(74) *Attorney, Agent, or Firm* — Dinsmore & Shohl LLP

(57) ABSTRACT

Disclosed are a method and device for determining a driving route of a sorting robot. The method discloses: weighing and scanning on an import platform in response to a sorting robot, and determining a destination of the sorting robot on a sorting map; determining, according to the destination, a target package drop on the sorting map; identifying two dumping points on a route which is perpendicular to an import direction of the import platform among dumping points of the target package drop; respectively calculating the costs of routes from the import platform to the two dumping points; determining the dumping point corresponding to the smaller cost of route to be the target dumping point on the sorting map; determining a preferred package drop route from predetermined package drop routes to be selected
(Continued)

from the import platform to the target dumping point; and sending a package drop task including the preferred package drop route to the sorting robot. Further disclosed are a method and device for determining a driving route of a sorting robot. The method and device improve the sorting efficiency of a sorting robot in a warehouse.

20 Claims, 7 Drawing Sheets

(51) Int. Cl.
      *G05D 1/00*           (2006.01)
      *G05D 1/02*           (2020.01)

(52) U.S. Cl.
      CPC ......... *G05D 1/0088* (2013.01); *G05D 1/0217* (2013.01); *G05D 2201/0216* (2013.01)

(56) References Cited

OTHER PUBLICATIONS

Gu Yan, Smart Sorting Robot Amaze Express Industry, DOI:10.19474/j.cnki.10-1156/f. 001110, New Technology & Lifestyle, 3 pages.

\* cited by examiner

METHOD AND DEVICE FOR DETERMINING DRIVING ROUTE OF SORTING ROBOT

CROSS-REFERENCE TO RELATED APPLICATIONS

The application is a national stage of International Application No. PCT/CN2018/082284, filed on Apr. 9, 2018, which claims priority to Chinese Patent Application No. 201710321486.2 filed on May 9, 2017, titled "Method and Apparatus for Determining a Driving Route of a Sorting Robot", the contents of each of which are herein incorporated by reference in their entireties.

TECHNICAL FIELD

The present disclosure relates to the field of logistics technology, specifically to the field of logistics distribution technology, and more specifically to a method and apparatus for determining a driving route of a sorting robot.

BACKGROUND

A clamshell sorting robot is an apparatus for warehouse sorting, configured for sorting small packages. A steel structure platform is built in a warehouse sorting center, and is divided into two layers. The first layer is a goods collection, labeling and packing area, and the second layer is a robot sorting area. Equipment in the second layer includes a package import platform and a sorting robot. The floor of the second layer may be affixed with quick response (QR) code to guide the sorting robot. In addition, the second layer has package drop openings on the ground, and the sorting robot may deliver a package to a basket in the first layer through a package drop opening corresponding to the destination of the package, and after filling the basket, the packages in the filled basket are loaded together.

In the robot sorting area of the second layer, the sorting robot having a steering function is provided with a cover that can be lifted toward one side. The sorting robot may load a package on a package inlet one at a time; and drive by scanning the QR code on the ground, and drop the package placed on the cover into the target package drop opening located on the ground of the second layer after the cover is lifted, according to a package drop path including a target package drop opening position of the package. During the driving, in order to prevent sorting robots from facing each other and collide or locking each other, the routes traveled by the sorting robots may be determined as one-way driving routes, and the sorting robots may be set to only pack one package at a time. The weight of the package do not exceed a preset weight.

However, in the process of sorting the packages, since the sorting robot can deliver the packages on all sides of the target package drop opening, which may cause congestion around the target package drop opening, and when the number of the inlets is large, there may be cases where the staff or working equipment of the inlets are waiting for the sorting robots, and it is necessary to adjust the queuing strategy for improvement.

SUMMARY

The objective of the present disclosure is to propose an improved method and apparatus for determining a driving route of a sorting robot to solve the technical problems mentioned in the above background section.

In a first aspect, the embodiments of the present disclosure provide a method for determining a driving route of a sorting robot, including: determining, in response to weighting and scanning for the sorting robot on an import platform, a destination of the sorting robot in a sorting map; determining, according to the destination, a target package drop opening in the sorting map; identifying two dumping points on a route perpendicular to an import direction of the import platform from dumping points of the target package drop opening; calculating respective route costs of routes from the import platform to the two dumping points; determining a dumping point corresponding to the smaller route cost as a target dumping point in the sorting map; determining a preferred package drop route among predetermined to-be-selected package drop routes from the import platform to the target dumping point; and sending a package drop task including the preferred package drop route to the sorting robot.

In some embodiments, the calculating respective route costs of routes from the import platform to the two dumping points includes: dividing each driving node of the sorting robot in the sorting map into four direction points including one east point, one south point, one west point and one north point in a turning map; using one-way edges to connect the east point to the south point, the east point to the north point, the south point to the east point, the south point to the west point, the west point to the south point, the west point to the north point, the north point to the east point and the north point to the west point, respectively, for the four direction points; establishing, corresponding to an original route between two adjacent driving nodes in the sorting map, a new route using a one-way edge connection in the turning map; and calculating the route costs of the routes from the import platform to the two dumping points, respectively, based on a preset cost of the one-way edge and routes from the import platform to the two dumping points of the sorting robot in the turning map.

In some embodiments, the determining a dumping point corresponding to the smaller route cost as a target dumping point in the sorting map includes: in response to a direction of flipping a cover of the sorting robot being a right side, a route on a north side of the package drop opening being a one-way route to east, and a route on a south side of the package drop opening being a one-way route to west, performing at least one of the following operations: determining, a dumping point located on the north side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the south side of the target package drop opening in the two dumping points of the target package drop opening on the route perpendicular to the import direction of the import platform in the sorting map, as the target dumping point, if the target package drop opening is located in a second quadrant or a third quadrant of the import platform.

In some embodiments, the determining a dumping point corresponding to the smaller route cost as a target dumping point in the sorting map includes: in response to a direction of flipping a cover of the sorting robot being a left side, a route on a north side of the package drop opening being a one-way route to east, and a route on a south side of the package drop opening being a one-way route to west, performing at least one of the following operations: determining, a dumping point located on the south side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the north side of the target package drop opening in the two dumping points of the target package drop opening on the route perpendicular to the import direction of the import platform in the sorting map, as the target dumping point, if the target package drop opening is located in a second quadrant or a third quadrant of the import platform.

In some embodiments, the method further includes: determining, in response to the sorting robot completing the package drop task, an import platform for returning the sorting robot, randomly or according to numbers of respective sorting robots belonging to import platforms; determining an empty vehicle temporary storage position having a smallest Manhattan distance to the target package drop opening from empty vehicle temporary storage positions of the import platform for returning the sorting robot; determining a preferred return route of predetermined to-be-selected return routes from the target package drop opening to the empty vehicle temporary storage position having the smallest Manhattan distance; and sending an empty vehicle temporary storage task including the preferred return route, to the sorting robot.

In some embodiments, the method further includes: determining whether the sorting robot needs to be charged, in response to the sorting robot reaching the empty vehicle temporary storage position; if the sorting robot needs to be charged, sending a charging task including a charging station position to the sorting robot; and if the sorting robot does not need to be charged, sending a queuing task including a queuing temporary storage position to the sorting robot.

In some embodiments, the queuing temporary storage position is an idle queuing temporary storage position that is closest to the import platform to which the empty vehicle temporary storage position belongs.

In some embodiments, the idle queuing temporary storage position that is closest to the import platform to which the empty vehicle temporary storage position belongs is determined by the following steps: traversing, from near to far based on a distance to the import platform to which the empty vehicle temporary storage position belongs, columns of queuing temporary storage positions until a column having the idle queuing temporary storage position is found; and determining, from the column having the idle queuing temporary storage position, an idle queuing temporary storage position closest to the import platform to which the empty vehicle temporary storage position belongs, as the idle queuing temporary storage position that is closest to the import platform to which the empty vehicle temporary storage position belongs.

In some embodiments, the method further includes: sending, in response to no sorting robot being located in a queue of queuing buffering positions adjoining the import platform, a first overall translation instruction to a sorting robot in a queue of queuing temporary storage positions that is closest to the queue of queuing buffering positions adjoining the import platform, and translating the sorting robot in the queue of queuing temporary storage positions that is closest to the queue of queuing buffering positions adjoining the import platform to the queue of queuing buffering positions adjoining the import platform.

In some embodiments, the method further includes: determining whether a current queue of queuing temporary storage positions does not have a sorting robot, from near to far based on a distance to the queue of queuing buffering positions, and if the current queue of queuing temporary storage positions does not have the sorting robot, sending a second overall translation instruction to a sorting robot in queuing temporary storage positions of a queue next to the current queue, and translating the sorting robot in queuing temporary storage positions of the next queue, to the current queue or queuing temporary storage positions.

In some embodiments, the method further includes: in response to the sorting robot located on the import platform leaving for responding to the package drop task, triggering a sorting robot located in a first position of a queue of queuing buffering positions to travel to the import platform.

In some embodiments, the method further includes: optimizing the method for determining a driving route of a sorting robot according to one or more indicators of: a total sorting time length, an import platform usage rate, and a total running time length of the sorting robot.

In a second aspect, the embodiments of the present disclosure provide an apparatus for determining a driving route of a sorting robot, including: a destination determining unit, configured to determine, in response to weighting and scanning for the sorting robot on an import platform, a destination of the sorting robot in a sorting map; a package drop opening determining unit, configured to determine, according to the destination, a target package drop opening in the sorting map; a dumping point identification unit, configured to identify two dumping points on a route perpendicular to an import direction of the import platform from dumping points of the target package drop opening; a route cost calculation unit, configured to calculate respective route costs of routes from the import platform to the two dumping points; a dumping point determining unit, configured to determine a dumping point corresponding to the smaller route cost as a target dumping point in the sorting map; a package drop route determining unit, configured to determine a preferred package drop route among predetermined to-be-selected package drop routes from the import platform to the target dumping point; and a package drop route sending unit, configured to send a package drop task including the preferred package drop route to the sorting robot.

In some embodiments, the route cost calculation unit includes: a node dividing subunit, configured to divide each driving node of the sorting robot in the sorting map into four direction points including one east point, one south point, one west point and one north point in a turning map; a one-way edge connection subunit, configured to use one-way edges to connect the east point to the south point, the east point to the north point, the south point to the east point, the south point to the west point, the west point to the south point, the west point to the north point, the north point to the east point and the north point to the west point, respectively, for the four direction points; a route connection subunit, configured to establish, corresponding to an original route between two adjacent driving nodes in the sorting map, a new route using a one-way edge connection in the turning map; and a cost calculation subunit, configured to calculate the route costs of the routes from the import platform to the two dumping points, respectively, based on a preset cost of the one-way edge and routes from the import platform to the two dumping points of the sorting robot in the turning map.

In some embodiments, the dumping point determining unit is further configured to: in response to a direction of flipping a cover of the sorting robot being a right side, a route on a north side of the package drop opening being a one-way route to east, and a route on a south side of the package drop opening being a one-way route to west, perform at least one of the following operations: determining, a dumping point located on the north side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the south side of the target package drop opening in the two dumping points of the target package drop opening on the route perpendicular to the import direction of the import platform in the sorting map, as the target dumping point, if the target package drop opening is located in a second quadrant or a third quadrant of the import platform.

In some embodiments, the dumping point determining unit is further configured to: in response to a direction of flipping a cover of the sorting robot being a left side, a route on a north side of the package drop opening being a one-way route to east, and a route on a south side of the package drop opening being a one-way route to west, perform at least one of the following operations: determining, a dumping point located on the south side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the north side of the target package drop opening in the two dumping points of the target package drop opening on the route perpendicular to the import direction of the import platform in the sorting map, as the target dumping point, if the target package drop opening is located in a second quadrant or a third quadrant of the import platform.

In some embodiments, the apparatus further includes: an import platform determining unit, configured to determine, in response to the sorting robot completing the package drop task, an import platform for returning the sorting robot randomly or according to numbers of respective sorting robots belonging to import platforms; a temporary storage position determining unit, configured to determine an empty vehicle temporary storage position having a smallest Manhattan distance to the target package drop opening from empty vehicle temporary storage positions of the import platform for returning the sorting robot; a return route determining unit, configured to determine a preferred return route of predetermined to-be-selected return routes from the target package drop opening to the empty vehicle temporary storage position having the smallest Manhattan distance; and a return route sending unit, configured to send an empty vehicle temporary storage task including the preferred return route, to the sorting robot.

In some embodiments, the apparatus further includes: a charging determining unit, configured to determine whether the sorting robot needs to be charged, in response to the sorting robot reaching the empty vehicle temporary storage position; a charging task sending unit, configured to, if the sorting robot needs to be charged, send a charging task including a charging station position to the sorting robot; and a queuing task sending unit, configured to, if the sorting robot does not need to be charged, send a queuing task including a queuing temporary storage position to the sorting robot.

In some embodiments, the queuing temporary storage position in the queuing task sending unit is an idle queuing temporary storage position that is closest to the import platform to which the empty vehicle temporary storage position belongs.

In some embodiments, the idle queuing temporary storage position that is closest to the import platform to which the empty vehicle temporary storage position belongs in the queuing task sending unit is determined by the following steps: traversing, from near to far based on a distance to the import platform to which the empty vehicle temporary storage position belongs, columns of queuing temporary storage positions until a column having the idle queuing temporary storage position is found; and determining, from the column having the idle queuing temporary storage position, an idle queuing temporary storage position closest to the import platform to which the empty vehicle temporary storage position belongs, as the idle queuing temporary storage position that is closest to the import platform to which the empty vehicle temporary storage position belongs.

In some embodiments, the apparatus further includes: a first overall translation instruction sending unit, configured to send, in response to no sorting robot being located in a queue of queuing buffering positions adjoining the import platform, a first overall translation instruction to a sorting robot in a queue of queuing temporary storage positions that is closest to the queue of queuing buffering positions adjoining the import platform, and translate the sorting robot in the queue of queuing temporary storage positions that is closest to the queue of queuing buffering positions adjoining the import platform to the queue of queuing buffering positions adjoining the import platform.

In some embodiments, the apparatus further includes: a second overall translation instruction sending unit, configured to determine whether a current queue of queuing temporary storage positions does not have a sorting robot, from near to far based on a distance to the queue of queuing buffering positions, and if the current queue of queuing temporary storage positions does not have the sorting robot, send a second overall translation instruction to a sorting robot in queuing temporary storage positions of a queue next to the current queue, and translate the sorting robot in queuing temporary storage positions of the next queue, to the current queue of queuing temporary storage positions.

In some embodiments, the apparatus further includes: an import platform traveling triggering unit, configured to, in response to the sorting robot located on the import platform leaving for responding to the package drop task, trigger a sorting robot located in a first position of a queue of queuing buffering positions to travel to the import platform.

In some embodiments, the apparatus further includes: a route optimization determining unit, configured to optimize the apparatus for determining a driving route of a sorting robot according to one or more of the following indicators: a total sorting time length, an import platform usage rate, and a total running time length of the sorting robot.

In a third aspect, the embodiments of the present disclosure further provide a device, including: one or more processors; a memory, for storing one or more programs; and the one or more programs, when executed by the one or more processors, cause the one or more processors to implement the method for determining a driving route of a sorting robot according to any one of the embodiments.

In a fourth aspect, the embodiments of the present disclosure provide a computer readable storage medium, storing a computer program thereon, the program, when executed by a processor, implements the method for determining a driving route of a sorting robot according to any one of the embodiments.

According to the method and apparatus for determining a driving route of a sorting robot provided by the embodiments of the present disclosure, first, in response to weighting and scanning for the sorting robot on an import platform, a destination of the sorting robot in a sorting map is determined; then a target package drop opening in the sorting map is determined according to the destination; two dumping points are identifier on a route perpendicular to an import direction of the import platform from dumping points of the target package drop opening; respective route costs of routes are calculated from the import platform to the two dumping points; a dumping point corresponding to the smaller route cost is determined as a target dumping point in the sorting map; a preferred package drop route among predetermined to-be-selected package drop routes from the import platform to the target dumping point is determined; and finally a package drop task including the preferred package drop route is sent to the sorting robot. In the embodiment, two dumping points on the route perpendicular to the import direction of the import platform are set as the dumping points of the target package drop opening, and the preferred package drop route are determined based on the two dumping points, thereby avoiding the sorting robot decelerating before the package is dropped and the sorting robot blocking other following sorting robots traveling at a constant speed when dropping the package, thereby improving the sorting efficiency at the sorting robot.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
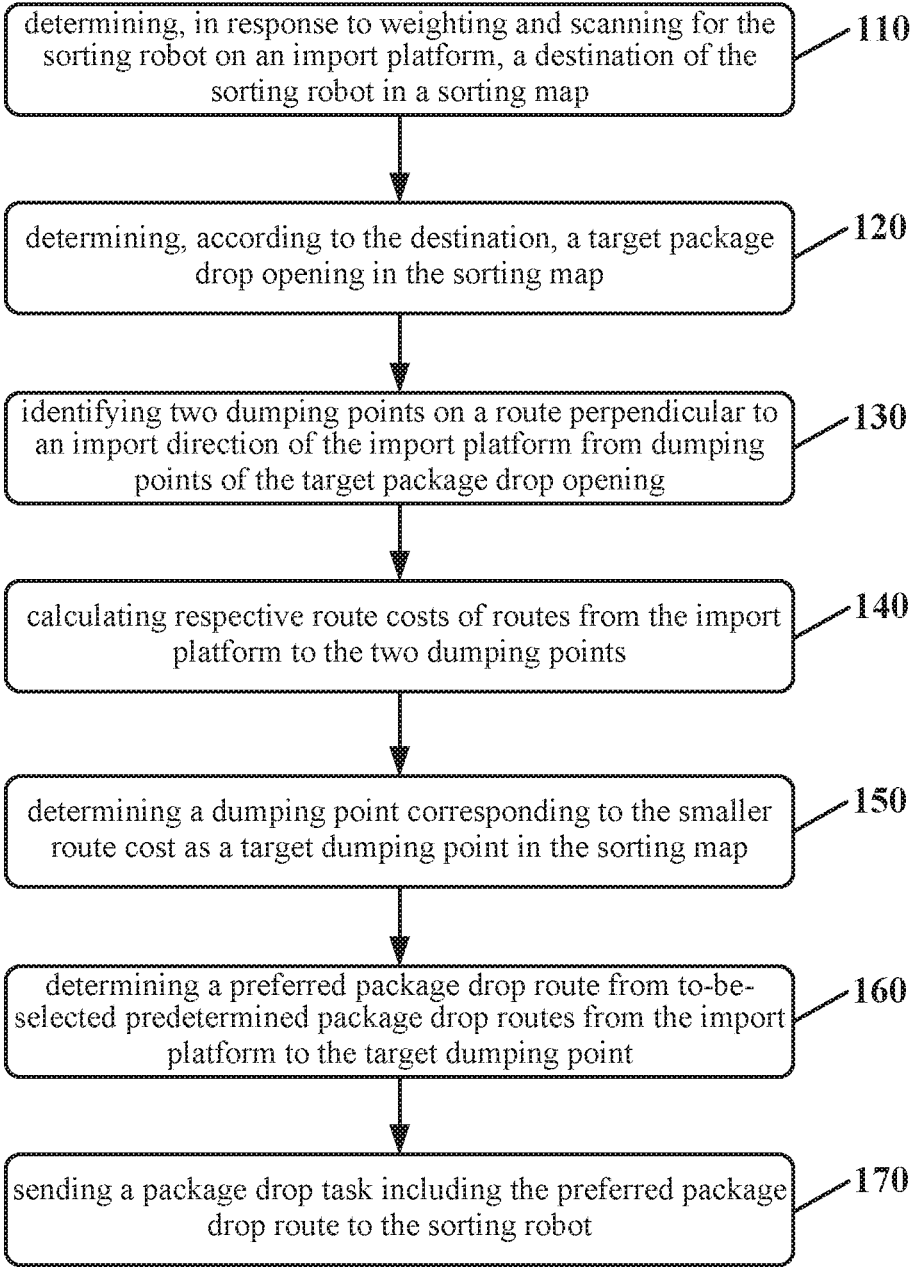
FIG. 1 is a schematic flowchart of an embodiment of a method for determining a driving route of a sorting robot according to the present disclosure.

FIG. 1 illustrates a schematic flowchart of a method for determining a driving route of a sorting robot according to the present disclosure. The method 100 for determining a driving route of a sorting robot includes steps 110 to 170.

Step 110 includes determining, in response to weighting and scanning for the sorting robot on an import platform, a destination of the sorting robot in a sorting map.

In the present embodiment, the sorting robot is an automatic guided transport vehicle equipped with a pallet, and is a wheeled mobile robot equipped with an automatic guiding apparatus such as electromagnetic or optical apparatus. The sorting robot can drive along a prescribed guiding route, and has safety protection and various moving and loading functions. The working staff or robotic arm puts the package on the pallet, and the remaining carrying and sorting are performed independently by the sorting robot.

The import platform receives a bar coded package and wraps the package onto the countertop of the sorting robot. A semi-automatic import platform that wraps manually or a fully automatic import platform using a robotic arm for wrapping may be used. Exemplarily, the import platform may include a weighing scanning platform. If a weighing result of a package on the weighing scanning table is lower than a weighing threshold of the sorting robot, the package is wrapped onto the pallet of the sorting robot, and a scanning result is sent to the control center of the sorting robot to determine the destination of the sorting robot. The sorting map here includes the planning and layout in the warehouse, specifically including the planning and layout of the import platform, the empty vehicle temporary storage position, the queuing temporary storage position, the charging station, the robot sorting area, the package drop opening, and the one-way routes.

Step 120 includes determining, according to the destination, a target package drop opening in the sorting map.

In the present embodiment, the bound destination of the package drop opening may be a large site or a small site. A small site may be bound to one package drop opening, and a large site may be bound to multiple package drop openings, so that the flow rate of the packet drop opening corresponding to the large site is close to (or on the same order of magnitude as) the flow rate of the packet drop opening corresponding to the small site. At the same time, the multiple package drop openings corresponding to large site may be arranged in the same area to facilitate subsequent loading operations.

After determining the destination, the target package drop opening of the sorting robot may be randomly determined or the target package drop opening of the sorting robot may be determined according to the numbers of sorting robots for reaching respective package drop openings. For example, if the numbers of sorting robots for reaching the three package drop openings of a large site is 3, 4, and 5 respectively, then the package drop opening for the 3 sorting robots may be used as the target package drop opening of the current sorting robot.

Step 130 includes identifying two dumping points on a route perpendicular to an import direction of the import platform from dumping points of the target package drop opening.

In the present embodiment, the import direction of the import platform is the same as the direction of a one-way route starting from the import platform. Dumping points may be arranged on the four sides of each package drop opening. Since the package drop opening is arranged on the side of the one-way route starting from the import platform, for the routes adjacent to the package drop opening, there are two routes perpendicular to the import direction. One dumping point is arranged on each of the routes perpendicular to the import direction, and there are two dumping points together.

Step 140 includes calculating respective route costs of routes from the import platform to the two dumping points.

In the present embodiment, the respective route costs of routes from the import platform to the two dumping points may be calculated based on the costs of driving in a straight line and costs of turning a corner from the import platform to the dumping points. The costs of driving in a straight line and costs of turning a corner may be determined based on the time cost and/or the energy consumption cost, respectively.

Step 150 includes determining a dumping point corresponding to the smaller route cost as a target dumping point in the sorting map.

In the present embodiment, based on the route costs of routes from the import platform to the two dumping points calculated in step 140, the dumping point corresponding to the smaller route cost may be selected as the target dumping point in the sorting map, so as to reduce the sorting cost.

Step 160 includes determining a referred package drop route from to-be-selected predetermined package drop routes from the import platform to the target dumping point.

In the present embodiment, in the to-be-selected predetermined package drop routes from the import platform to the target dumping point, a to-be-selected package drop route may be randomly selected as the preferred package drop route, or a to-be-selected package drop route in which the least number of sorting robots are travelling may alternatively be selected from the to-be-selected package drop routes as the preferred package drop route.

Step 170 includes sending a package drop task including the preferred package drop route to the sorting robot.

In the present embodiment, based on the preferred package drop route determined in step 160, the package drop task including the preferred package drop route is sent to the sorting robot so that the sorting robot travels in accordance with the instruction of the control center to complete the sorting task.

The method for determining a driving route of a sorting robot provided by the above embodiment of the present disclosure determines the preferred package drop route based on the two dumping points on the route perpendicular to the import direction of the import platform, thereby avoiding the blockage caused by the sorting robot decelerating before the package is dropped, and the staying when the package is dropped, so that the other sorting robots behind may still drive at a constant speed. Therefore, the moving speed of the sorting robot is improved, further improving the sorting efficiency of the sorting robot.

The method for calculating a route cost of an import platform to a dumping point in FIG. 1 is described below with reference to FIG. 2*a*.

Figure 2A:
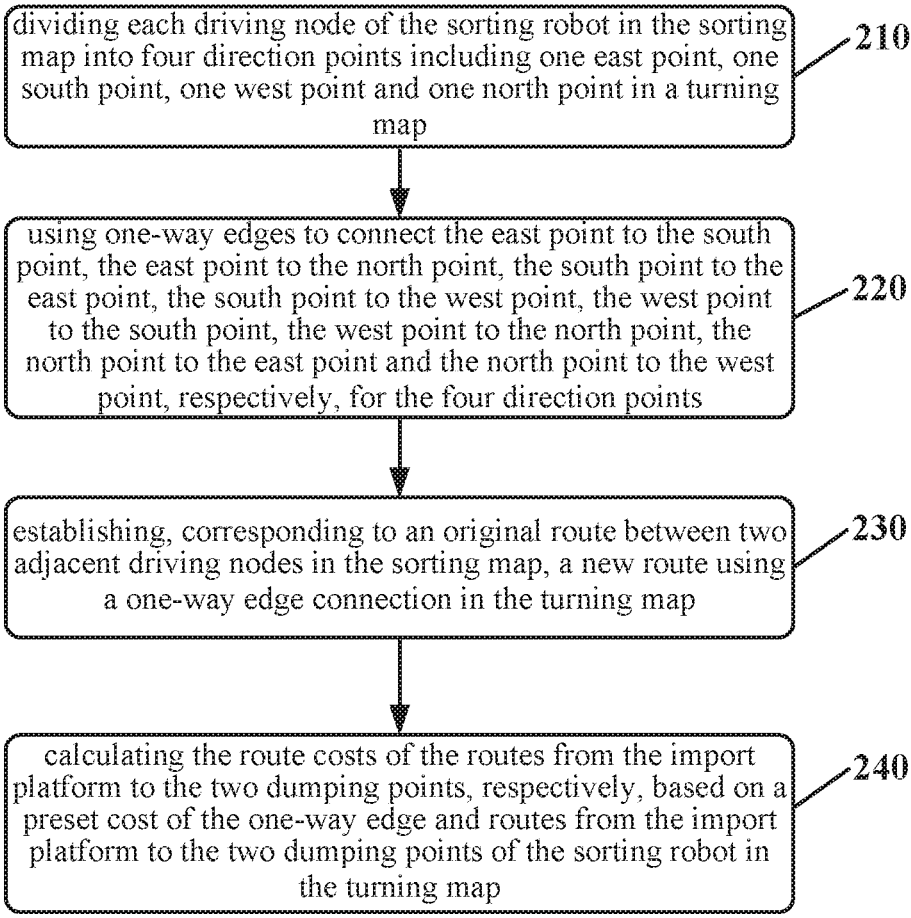
FIG. 2a is a schematic flowchart of an embodiment of a method for calculating a route cost of a route from an import platform to a dumping point in FIG. 1.

In the present embodiment, as shown in FIG. 2*a*, the method 200 for calculating a route cost of an import platform to a dumping point includes steps 210 to 240.

Step 210 includes dividing each driving node of the sorting robot in the sorting map into four direction points including one east point, one south point, one west point and one north point in a turning map.

In the present embodiment, each driving node of the sorting robot in the sorting map, that is, the node that the sorting robot needs to pass in the driving route of the sorting map, is embodied in the sorting map, that is, one cell of a grid in the map, for example, in the map, the import platform, the empty vehicle temporary storage position, the queuing temporary storage position, the charging station, or the package drop opening is presented as one cell of the grid.

Step 220 includes using one-way edges to connect the east point to the south point, the east point to the north point, the south point to the east point, the south point to the west point, the west point to the south point, the west point to the north point, the north point to the east point and the north point to the west point, respectively, for the four direction points.

In the present embodiment, by setting the four direction points including the east point, the south point, the west point and the north point and using the one-way edges to connect the east point to the south point, the east point to the north point, the south point to the east point, the south point to the west point, the west point to the south point, the west point to the north point, the north point to the east point and the north point to the west point, respectively, the turning cost in the original route may be converted to the cost of the one-way edges.

Step 230 includes establishing, corresponding to an original route between two adjacent driving nodes in the sorting map, a new route using a one-way edge connection in the turning map.

In the present embodiment, by establishing the new route using the one-way edge connection in the turning map, corresponding to the original route between the two adjacent driving nodes in the sorting map, the cost of the straight route in the original route may be converted to the cost of the route using the one-way edge connection in the turning map.

Step 240 includes calculating the route costs of the routes from the import platform to the two dumping points, respectively, based on a preset cost of the one-way edge and routes from the import platform to the two dumping points of the sorting robot in the turning map.

In the present embodiment, the cost of the route from the import platform to each of the dumping points of the sorting robot in the turning map may be calculated, respectively, based on the preset cost of the one-way edge and the routes from the import platform to the two dumping points of the sorting robot in the turning map.

Figures 2B, 2C:
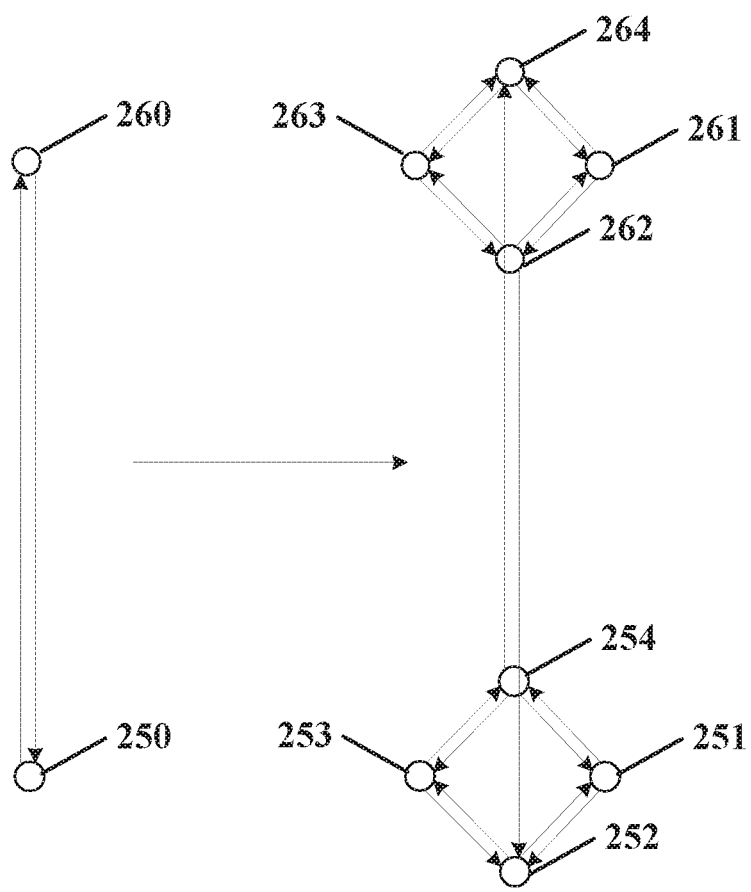
FIG. 2b is an exemplary structural diagram of a sorting map for calculating a cost of a route between driving nodes of a sorting robot according to the present disclosure.
FIG. 2c is an exemplary structural diagram of a turning map for calculating a cost of a route between driving nodes of a sorting robot according to the present disclosure.

With further reference to FIG. 2*b* and FIG. 2*c*, FIG. 2*b* shows an exemplary structural diagram of a sorting map for calculating a route cost between driving nodes of a sorting robot; and FIG. 2*c* shows an exemplary structural diagram of a turning map for calculating a route cost between driving nodes of a sorting robot.

As shown in FIG. 2*b*, taking a route between a driving node 250 and a driving node 260 in the sorting map as an example, the driving node 250 is divided into four direction points including the east point, the south point, the west point, and the north point, and the direction points 251, 252, 253, and 254 in the turning map may be obtained as shown in FIG. 2c; the driving node 260 in the sorting map is divided into four direction points including the east point, the south point, the west point, and the north point, and the direction points 261, 262, 263, and 264 in the turning map may be obtained. In this case, based on the newly established direction points of each of the driving nodes respectively, eight new one-way edges from east to south, east to north, south to east, south to west, west to south, west to north, north to east and north to west, are newly built, and the cost of each edge obtained is the turning cost. For the original route between the driving node 250 and the driving node 260, a one-way edge from the direction point 254 to the direction point 264 and a one-way edge from the direction point 262 to the direction point 252 are established in the map with the turning radius. The costs of these two one-way edges is the original route cost.

According to the method for calculating a route cost of an import platform to a dumping point provided by the above embodiment of the present disclosure, the route cost is calculated by establishing a map with a turning radius, thereby improving the efficiency and accuracy of calculating the route cost. Thus, the control center of the sorting robot may reasonably determine the driving route of the sorting robot and improve the operating efficiency of the sorting robot.

According to the method for calculating a route cost of an import platform to a dumping point in FIG. 2 above, the following two examples illustrate how to determine the dumping point corresponding to the smaller route cost as the target dumping point in the sorting map.

In the first example, the direction of flipping the cover of the sorting robot being the right side, the route on the north side of the package drop opening being a one-way route to east, and the route on the south side of the package drop opening being a one-way route to west, is taken as an example to illustrate how to determine the dumping point corresponding to the smaller route cost as the target dumping point in the sorting map.

In the case where the direction of flipping the cover of the sorting robot is the right side, the route on the north side of the package drop opening is a one-way route to east, and the route on the south side of the package drop opening is a one-way route to west, the determining a dumping point corresponding to the smaller route cost as a target dumping point in the sorting map may include: determining, a dumping point located on the north side of the target package drop opening in the two dumping points of the target package drop opening on the route perpendicular to the import direction of the import platform in the sorting map, as the target dumping point, if the target package drop opening is located in she first quadrant or the fourth quadrant of the import platform; and determining, a dumping point located on the south side of the target package drop opening in the two dumping points of the target package drop opening on the route perpendicular to the import direction of the import platform in the sorting map, as the target dumping point, if the target package drop opening is located in the second quadrant or the third quadrant of the import platform.

In the second example, the direction of flipping the cover of the sorting robot is the left side, the route on the north side of the package drop opening is a one-way route to east, and the route on the south side of the package drop opening is a one-way route to west, is taken as an example to illustrate how to determine the dumping point corresponding to the smaller route cost as the target dumping point in the sorting map.

In the case where the direction of flipping the cover of the sorting robot the left side, the route on the north side of the package drop opening is a one-way route to east, and the route on the south side of the package drop opening is a one-way route to west, for example, the determining a dumping point corresponding to the smaller route cost as a target dumping point in the sorting map may include: determining, a dumping point located on the south side of the target package drop opening in the two dumping points of the target package drop opening on the route perpendicular to the import direction of the import platform in the sorting map, as the target dumping point, if the target package drop opening is located in the first quadrant or the fourth quadrant of the import platform; and determining, a dumping point located on the north side of the target package drop opening in the two dumping points of the target package drop opening on the route perpendicular to the import direction of the import platform in the sorting map, as the target dumping point, if the target package drop opening is located in the second quadrant or the third quadrant of the import platform.

It should be understood that the above two examples are merely exemplary descriptions of the method for determining a dumping point corresponding to the smaller route cost as a target dumping point in the sorting map, and do not represent a limitation to the present disclosure, for example, the direction of flipping the cover of the sorting robot may be the left side, the route on the north side of the package drop opening may alternatively be a one-way route to west, and the route on the south side of the package drop opening may alternatively be a one-way route to east, etc.

In some embodiments of the present disclosure, the method for determining a driving route or a sorting robot may further include a step of determining the import platform for returning the sorting robot: for example, determining, in response to the sorting robot completing the package drop task, an import platform for returning the sorting robot, randomly or according to numbers of respective sorting robots belonging to import platforms. When determining the import platform for returning the sorting robot, the method may further include a step of determining an empty vehicle temporary storage position, for example, determining an empty vehicle temporary storage position having a smallest Manhattan distance to the target package drop opening from empty vehicle temporary storage positions of the import platform for returning the sorting robot; then, determining a preferred return route from the current target package drop opening to the determined empty vehicle temporary storage position, for example, determining a preferred return route of predetermined to-be-selected return routes from the target package drop opening to the empty vehicle temporary storage position having the smallest Manhattan distance. Finally, the method further includes a step of sending an empty vehicle temporary storage task including the preferred return route, to the sorting robot.

Through the steps of returning to the import platform, the efficiency of the sorting robot to return to the import platform may be improved, thereby improving the flow efficiency of the sorting robots in the warehouse.

In some embodiments of the present disclosure, the method for determining a driving route of a sorting robot may further include steps of issuing a next execution instruction for the sorting robot that reaches the empty vehicle temporary storage position, for example, determining whether the sorting robot needs to be charged, in response to the sorting robot reaching the empty vehicle temporary storage position; if the sorting robot needs to be charged, sending a charging task including a charging station position to the sorting robot; and if the sorting robot does not need to be charged, sending a queuing task including a queuing temporary storage position to the sorting robot.

Here, the charging task including the charging station position is sent to the sorting robot and the queuing task including the queuing temporary storage position is sent to the sorting robot. The next execution instruction that needs to be executed by the sorting robot may be determined based on the power status of the sorting robot, which may improve the flow efficiency of the sorting robot.

When the queuing task including the queuing temporary storage position is sent to the sorting robot, the queuing temporary storage position may be any one of the queuing temporary storage positions of a queue of queuing temporary storage positions. In order to reduce the time for traveling to the import platform by the sorting robot of the queuing temporary storage position, in some alternative implementations of the above embodiments of the present disclosure, the queuing temporary storage position may be an idle queuing temporary storage position that is closest to the import platform to which the empty vehicle temporary storage position belongs.

The idle queuing temporary storage position that is closest to the import platform to which the empty vehicle temporary storage position belongs may be determined based on the distance between the empty vehicle temporary storage position and the import platform. For example, in some alternative implementations of the above embodiments of the present disclosure, the idle queuing temporary storage position that is closest to the import platform to which the empty vehicle temporary storage position belongs may be determined according to the following steps: traversing, from near to far based on the distance to the import platform to which the empty vehicle temporary storage position belongs, columns of queuing temporary storage positions by the control center of the sorting robot, until a column having the idle queuing temporary storage position is found; and determining, from the column having the idle queuing temporary storage position, an idle queuing temporary storage position closest to the import platform to which the empty vehicle temporary storage position belongs, as the idle queuing temporary storage position that is closest to the import platform to which the empty vehicle temporary storage position belongs. Through the method for determining the idle queuing temporary storage position that is closest to the import platform to which the empty vehicle temporary storage position belongs, the idle queuing temporary storage position that is closest to the import platform to which the empty vehicle temporary storage position belongs may be quickly and effectively determined, thereby improving the flow efficiency of the sorting robot.

In some alternative implementations of the above embodiments of the present disclosure, the method for determining a driving route of a sorting robot further includes: sending, in response to no sorting robot being located in a queue of queuing buffering positions adjoining the import platform, a first overall translation instruction to a sorting robot in a queue of queuing temporary storage positions that is closest to the queue of queuing buffering positions adjoining the import platform, and translating the sorting robot in the queue of queuing temporary storage positions that is closest to the queue of queuing buffering positions adjoining the import platform to the queue of queuing buffering positions adjoining the import platform. By translating the sorting robot in the queue of queuing temporary storage positions that is closest to the queue of queuing buffering positions adjoining to the queue of queuing buffering positions having no sorting robot, the distance of the sorting robot to the import platform may be reduced, and the sorting robot is prepared for entering the import platform, thereby improving the flow efficiency of the sorting robot.

In some alternative implementations of the above embodiments of the present disclosure, the method for determining a driving route of a sorting robot may further include: determining whether the current queue of queuing temporary storage positions does not have a sorting robot, from near to far based on the distance to the queue of queuing buffering positions, and if the current queue of queuing temporary storage positions does not have the sorting robot, sending a second overall translation instruction to a sorting robot in queuing temporary storage positions of a queue next to the current queue, and translating the sorting robot in queuing temporary storage positions of the next queue, to the current queue of queuing temporary storage positions. By translating the sorting robot in queuing temporary storage positions of the next queue, to the current queue of queuing temporary storage positions, the distance of the sorting robot originally in the queuing temporary storage positions of the next queue to the import platform may be reduced, and the sorting robot is prepared for entering the queuing buffering position, thereby improving the flow efficiency of the sorting robot.

In some alternative implementations of the above embodiments of the present disclosure, the method for determining a driving route of a sorting robot further includes: in response to the sorting robot located on the import platform leaving for responding to the package drop task, triggering a sorting robot located in a first position of a queue of queuing buffering positions to travel to the import platform. By triggering the sorting robot located in the first position of the queue of queuing temporary storage positions to travel to the import platform, the time for the sorting robot to reach the import platform may be reduced, thereby improving the flow efficiency of the sorting robot.

In some alternative implementations of the above embodiments of the present disclosure, the method further includes: optimizing the method for determining a driving route of a sorting robot according to one or more of the following indicators: a total sorting time length, an import platform usage rate, and a total running time length of the sorting robot.

In the present implementation, the total sorting time length refers to the time length required for sorting all packages by a sorting system when the import platforms successively provide a predetermined number of packages to be sorted. The shorter the total sorting time length is, the higher the system efficiency is. The import platform usage rate is calculated by subtracting the import platform idle rate from 1, where the import platform idle rate is the total time length that the staff waits for the sorting robot divided by the total sorting time length. The import platform idle rate for each import platform is calculated respectively. The lower the import platform idle rate is, the higher the import platform usage rate is, that is, the higher the efficiency of the sorting system is. The total running time length of the sorting robot refers to the sum of the running time lengths of respective sorting robots. The lower the idle rate of the import platforms is, the higher the efficiency of the sorting system is if the total running time length of the sorting robot is higher.

Through the method for optimizing the method for determining a driving route of a sorting robot according to the indicators in the present implementation, the method for determining a driving route of a sorting robot may be continuously optimized and iterated, thereby further improving the efficiency of the sorting system and reducing the empty vehicle rate of the sorting robot.

Figure 3A:
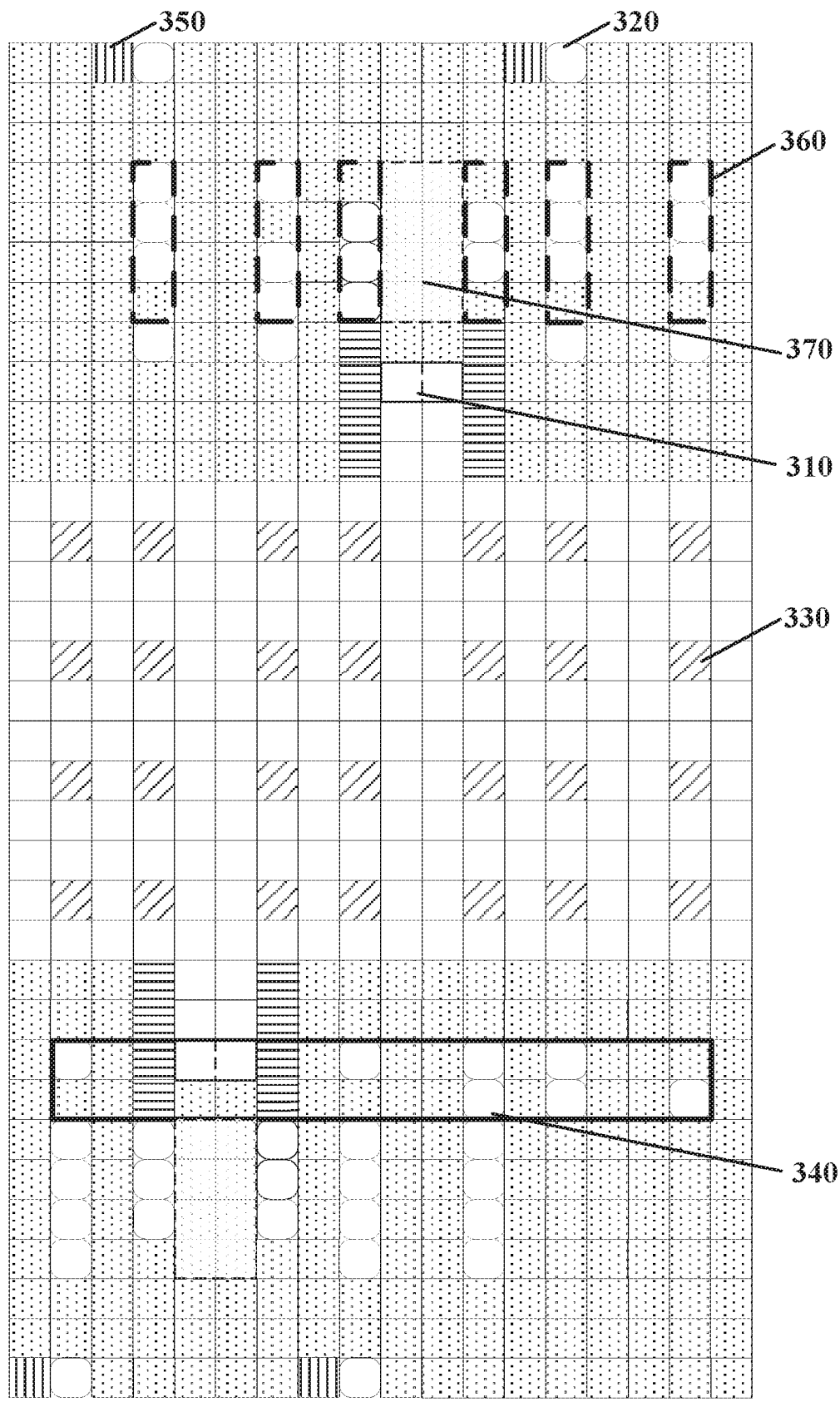
FIG. 3a shows a schematic diagram of an embodiment of a sorting map for the method for determining a driving route of a sorting robot according to the present disclosure.

With further reference to FIG. 3a, FIG. 3a shows a schematic diagram of an embodiment of a sorting map in the method for determining a driving route of a sorting robot according to the embodiments of the present disclosure.

As shown in FIG. 3a, the sorting map includes an import platform 310, a sorting robot 320, a package drop opening 330, an empty vehicle temporary storage position 340, a charging station 350, a queuing temporary storage position 360, and a queuing buffering position 370.

Taking the warehouse in the sorting map as an example, the middle part is the sorting area, there is one import platform on the north side and one import platform on the south side, and each import platform includes two weighing and scanning platforms on the left and right sides respectively. The staff loads packages to the sorting robot manually on the import platform. There are 35 package drop openings in the sorting area. There are 4 charging piles, 2 of which are located in the top row of the map and 2 of which are located in the bottom row of the map. There are a total of 50 sorting robots.

In this sorting map, the planning and layout include:

1. Import Platform Planning

The import platform has a width of 2, that is, two empty vehicles may queue and wait for loading the package after the import platform. Since the two columns of passages facing the import platform are one-way lanes, and the directions of the one-way lanes are the same as the import direction of the import platform, the import platform on the north side is not opposite to the import platform on the south side, but is interlaced.

2. Package Drop Opening Arrangement

Each package drop opening has four adjacent positions on the top, bottom, left, and right (i.e., north, south, west and east), but only the top and bottom positions are available for the sorting robot to drop the package. This is because the sorting robot needs to decelerate in advance before dropping the package, and it takes time to drop the package, which may block other sorting robots driving at a constant speed.

3. Package Drop Opening Layout

1) The package drop opening cannot be located in the same column as the import platform, and the package drop opening is separated by a minimum of one cell of grid from the left package drop opening and from the right package drop opening.

2) In principle, each package drop opening is provided with the top and bottom dumping points for the sorting robot, so that there are at least 2 cells of the grid between the upper drop opening and the lower package drop opening, that is, there are two one-way lanes with opposite directions between the upper and lower package drop openings. Taking the case that the sorting robot can only flip the cover on the right side to drop the package as an example, the one-way lane on the north side of the package drop opening is oriented to the right, and the one-way lane on the south side of the package drop opening is oriented to the left.

When the package drop opening is bound to the site, a small site is bound to one package drop opening; a large site is bound to multiple package drop openings, so that the flow rate of the packet drop opening corresponding to the large site is close to (or on the same order of magnitude as) the flow rate of the packet drop opening corresponding to the small site. In addition, the multiple package drop openings corresponding to large site should be arranged in the same area to facilitate subsequent loading operations.

Based on the sorting map as shown in FIG. 3a, an application scenario of the method for determining a driving route of a sorting robot of the embodiments of the present disclosure includes: determining a robot sorting process, determining a preferred route algorithm, and determining a system indicator.

Below is a description of how to determine a robot sorting process, determine a preferred route algorithm, and determine a system indicator.

1. Determining a Robot Sorting Process

After receiving a package from the import platform, the sorting robot advances one cell into a weighing scanning table for weighing and scanning to determine the destination of the package. A bound package drop opening is found according to the destination, and a shortest route is selected to assign a package drop task to the sorting robot. After the sorting robot reaches the package drop opening and delivers the package, a task of traveling to an empty vehicle temporary storage position is assigned to the sorting robot. When the sorting robot reaches the empty vehicle temporary storage position, and if the sorting robot does not need to be charged, a queuing task for travelling to the queuing temporary storage position is allocated to the sorting robot, and the sorting robot enters the queuing area. If the sorting robot needs charging, a charging task for traveling to a charging station position is allocated to the sorting robot.

2. Determining a Preferred Route Algorithm

The determining a preferred route algorithm may include a sorting area route algorithm and a queuing area route algorithm. The sorting area route algorithm and the queuing area route algorithm are described below.

1) The sorting area route algorithm includes determining the dumping point selection of the sorting robot on the north side and on the south side, determining the sorting route, determining the strategy for conflicts on intersections of the sorting area, and determining the route for returning to the empty vehicle temporary storage position.

For selecting the dumping point of the sorting robot on the north side and on the south side, for each package drop opening, there are generally two dumping points on the north side and on the south side for selection by the sorting robot. After each sorting robot is loaded and the package drop opening is determined, only one dumping point for the sorting robot can be selected. The selection of the dumping point is determined by the relative position of the import platform and the package drop opening. Taking the import platform as the origin, if the position of the package drop opening falls in the first or fourth quadrant of the import platform, the north side dumping point of the package drop opening is selected for a package starting from the import platform; and if the position of the package drop opening falls in the second or third quadrant, the south side dumping point is selected. As shown in the following figure, the package drop opening is located in the first quadrant of the import platform. In the schematic diagram of the sorting area, the package drop opening is located at the upper right of the import platform, and the north side sorting robot dumping point of the package drop opening should be selected.

Figure 3B:
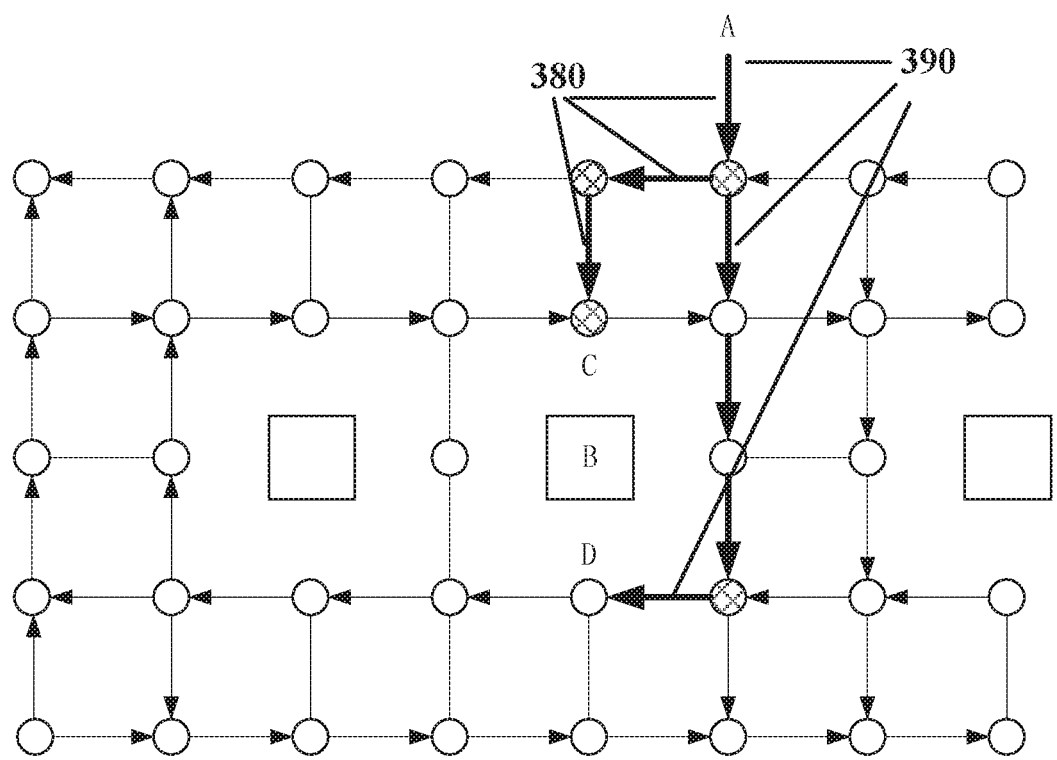
FIG. 3b shows a schematic diagram of an embodiment of a sorting map for selecting a dumping point according to the present disclosure.

In addition, for the case where the position of the package drop opening falls to the first or third quadrant, the selection of the dumping point requires additional explanation. Although in both cases, as shown in FIG. 3b, according to the above dumping point selection, the route of the sorting robot may be longer than the route for selecting the dumping point on the other side, the number of turns that the sorting robot needs to take is two times fewer. Assuming that the import platform is located at point A, a package starting from point A needs to be put into the package drop opening at point B, the ending point of a route 380 is the north side dumping point C, and the ending point of a route 390 is the south side dumping point D. Although the route 380 has two cells fewer than the route 390 in length, the route 380 requires two more turns, that is, for the sorting robot using the route 380, it needs to adjust the orientation to the right to dump the package. Every time the sorting robot turns, it requires extra time and energy consumption, including time and energy consumption for deceleration, turning, restart, which is more time and energy consuming than driving straight. Moreover, due to deceleration and turning, during each turning, other sorting robots behind the sorting robot in the original driving direction may be blocked, and the turning itself may affect the sorting robot in the new driving direction.

Returning to FIG. 3*a*, the shortest route is pre-stored for determining the sorting route for each pair of the import platform and the dumping point of the package drop opening. If there are multiple shortest routes, a predetermined number of routes may be randomly stored or stored in accordance with a predetermined rule for each pair of the import platform and the dumping point of the package drop opening.

The sorting robot binds information of a package while the weighing scanning table scans the package. The sorting robot control center determines that the starting point of the sorting robot is the current weighing scanning table, and the ending point of the sorting robot is the package drop opening corresponding to the package. If the destination of the package corresponds to multiple package drop openings, a package drop opening may be randomly selected or a package drop opening with a smaller number or sorting robots may be selected. After determining the starting point and the ending point of the sorting robot, the control center randomly selects one of the pre-stored shortest routes (that is, to-be-selected package drop routes) as the preferred package drop route, and sends a package drop task including the preferred package drop route to the sorting robot, to prevent the sorting robots from over-concentrating in a certain area.

In determining the strategy for conflicts on intersections of the sorting area, since the sorting area sets one-way lanes, the sorting robot does not encounter a face-to-face collision, and only side conflicts may occur at the intersections. When a conflict occurs, the sorting robot control center determines which sorting robot waits without re-planning the route.

For determining the route to return to the empty vehicle temporary storage position, the shortest route (i.e., to-be-selected return route) is pre-stored for each pair of the dumping point of the package drop opening and the empty vehicle temporary storage position. If there are multiple shortest routes, a predetermined number of to-be-selected return routes may be stored for each pair of impart platform and the dumping point of the package drop opening.

Due to the equalization of the flow rate of each import platform, the control center randomly selects an import platform for returning the sorting robot that completes sorting. The control center determines that the starting point of the return route of the sorting robot that completes sorting to the empty vehicle temporary storage position is the dumping point of the current package drop opening, and the ending point is the empty vehicle temporary storage position of the import platform having the smallest Manhattan distance. After determining the starting point and the ending point of the sorting robot, the control center randomly selects one of the pre-stored shortest routes (i.e., to-be-selected return routes) as the preferred return route, and sends an empty vehicle temporary storage task including the preferred return route to the sorting robot.

2) The queuing area route algorithm includes determining the arrangement of the queuing area, determining the priority of the queuing temporary storage position, determining the queuing strategy, and determining the empty vehicle balancing strategy.

For determining the arrangement of the queuing area, there are two weighing and scanning tables on the left and right at each import platform, and each weighing scanning table corresponds to a column of queuing buffering positions. Each column has 4 queuing buffering positions. The queuing buffering position is used to quickly supplement an empty vehicle to the import platform. In addition to the queuing buffering positions, there are still one or two columns of queuing temporary storage positions on each of the left side and the right side of each platform. The queuing temporary storage position is used to supplement an empty vehicle to the queuing buffering position, and to park empty vehicles for a long time when the import platform is not busy.

For determining the priority of the queuing temporary storage position, the priority of the queuing temporary storage positions on the same side of the same import platform is set as: first column>second column>third column; and the priority of the queuing temporary storage position in the same column of queuing temporary storage positions is set as: the closer to the import platform the queuing temporary storage position is, the higher the priority of the queuing temporary storage position is.

For determining the queuing strategy, from the empty vehicle temporary storage position to the queuing temporary storage position: a task for travelling to a top-priority queuing temporary storage position of the import platform to which the empty vehicle temporary storage position belongs is sent to the sorting robot on the empty vehicle temporary storage position; from the queuing temporary storage position to the queuing buffering position: if there is no sorting robot on a column of queuing buffering positions, triggers the sorting robot in the closest column (column 1) of queuing temporary storage positions to translate overall in column to the queuing buffering position, and at the same time triggers the sorting robot in column 2 of queuing temporary storage positions to translate overall to the column 1 of queuing temporary storage positions; and from the queuing buffering position to the weighing and scanning table: once a sorting robot leaves from the weighing and scanning table, triggers a sorting robot in the queuing buffering position at once to travel to the weighing scanning table.

For determining the empty vehicle balancing strategy, the numbers of available sorting robots at respective impart platforms may be unbalanced, which may be solved by the strategy conversion of a task for returning to the empty vehicle temporary storage position or by scoring the empty vehicle temporary storage position.

3. Determining a System Indicator

After determining the driving route of the sorting robot according to the method for determining a driving route of a sorting robot in the above application scenario, the method for determining a driving route of a sorting robot may further include calculating the following system indicators:

1) Total Sorting Time Length

The time required by a sorting system for sorting all packages, when the import platforms successively provide a predetermined number of packages to be sorted. The shorter the total sorting time length is, the higher the system efficiency is.

2) The Import Platform Usage Rate

The import platform usage rate is equal to the total time that the staff waits for the sorting robot divided by the total sorting time length. The import platform idle rate is calculated for each import platform respectively. The lower the import platform idle rate is, the higher the efficiency of the sorting system is.

3) The Total Running Time Length of the Sorting Robot

The running time length of the sorting robot includes the length for the time when the sorting robot has a moving task. The total running time length of the sorting robot is equal to the sum of the running time lengths of the sorting robots. When the usage rate of the import platforms is close to 100%, the smaller the total running time length of the sorting robot, the better.

After the above system indicators are determined, the method for determining a driving route of a sorting robot in the embodiments of the present disclosure may be optimized according to the system indicators.

The method for determining a driving route of a sorting robot provided in the application scenario of the above embodiment of the present disclosure may further optimize the driving route of the sorting robot by determining the robot sorting process, determining the preferred route algorithm and system indicator optimization, thereby improving the sorting efficiency of the sorting robot.

Figure 4:
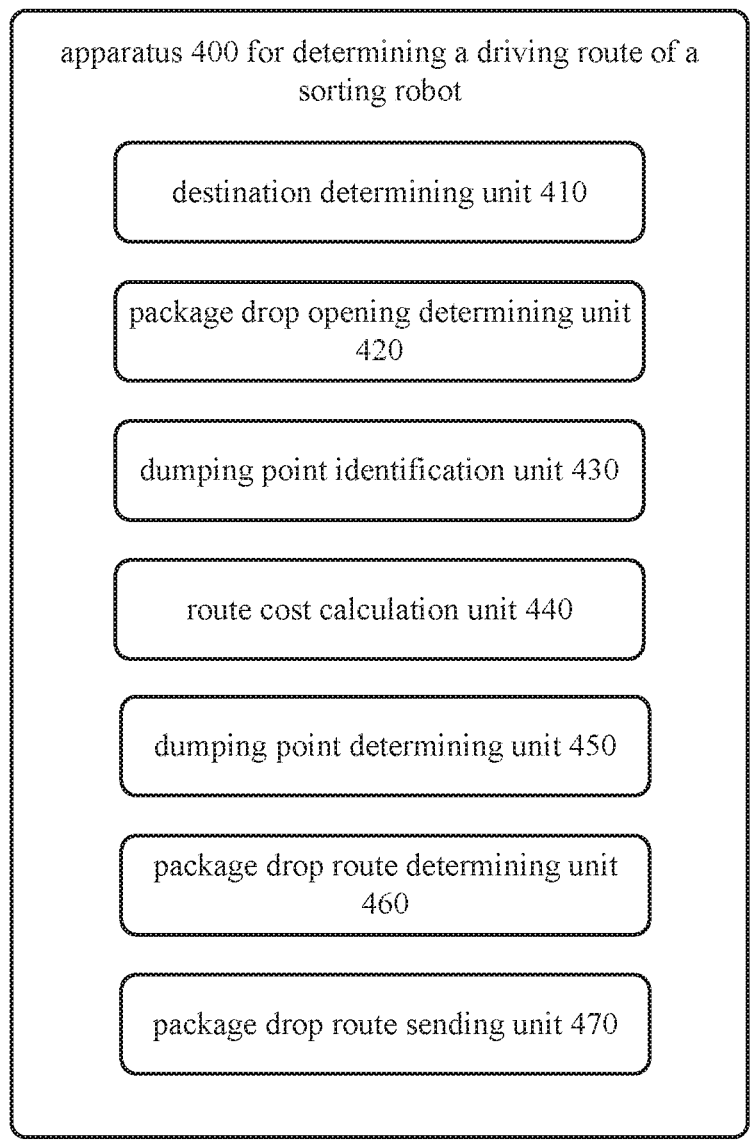
FIG. 4 is an exemplary structural diagram of an embodiment of an apparatus for determining a driving route of a sorting robot according to the present disclosure.

With further reference to FIG. 4, as an implementation of the above method, an embodiment of the present disclosure provides an apparatus for determining a driving route of a sorting robot, and the embodiment of the apparatus for determining a driving route of a sorting robot corresponds to the embodiment of the method for determining a driving route of a sorting robot shown in FIGS. 2a, 2b, 2c, 3a and 3b. Thus, the operations and features described above with respect to the method for determining a driving route of a sorting robot in FIGS. 1, 2a, 2b, 2c, 3a, and 3b are equally applicable to an apparatus 400 for determining a driving route of a sorting robot and the steps contained therein, and detailed description thereof will be omitted.

As shown in FIG. 4, the apparatus 400 for determining a driving route of a sorting robot includes: a destination determining unit 410, configured to determine, in response to weighting and scanning for the sorting robot on an import platform, a destination of the sorting robot in a sorting map; a package drop opening determining unit 420, configured to determine, according to the destination, a target package drop opening in the sorting map; a dumping point identification unit 430, configured to identify two dumping points on a route perpendicular to an import direction of the import platform from dumping points of the target package drop opening; a route cost calculation unit 440, configured to calculate respective route costs of routes from the import platform to the two dumping points; a dumping point determining unit 450, configured to determine a dumping point corresponding to the smaller route cost as a target dumping point in the sorting map; a package drop route determining unit 460, configured to determine a preferred package drop route among predetermined to-be-selected package drop routes from the import platform to the target dumping point; and a package drop route sending unit 470, configured to send a package drop task including the preferred package drop route to the sorting robot.

In some alternative implementations of the present embodiment, the route cost calculation unit includes: a node dividing subunit, configured to divide each driving node of the sorting robot in the sorting map into four direction points including one east point, one south point, one west point and one north point in a turning map; a one-way edge connection subunit, configured to use one-way edges to connect the east point to the south point, the east point to the north point, the south point to the east point, the south point to the west point, the west point to the south point, the west point to the north point, the north point to the east point and the north point to the west point, respectively, for the four direction points; a route connection subunit, configured to establish, corresponding to an original route between two adjacent driving nodes in the sorting map, a new route using a one-way edge connection in the turning map; and a cost calculation subunit, configured to calculate the route costs of the routes from the import platform to the two dumping points, respectively, based on a preset cost of the one-way edge and routes from the import platform to the two dumping points of the sorting robot in the turning map.

In some alternative implementations of the present embodiment, the dumping point determining unit is further configured to: in response to a direction of flipping a cover of the sorting robot being a right side, a route on a north side of the package drop opening being a one-way route to east, and a route on a south side of the package drop opening being a one-way route to west, perform at least one of the following operations: determining, a dumping point located on the north side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the south side of the target package drop opening in the two dumping points of the target package drop opening on the route perpendicular to the import direction of the import platform in the sorting map, as the target dumping point, if the target package drop opening is located in a second quadrant or a third quadrant of the import platform.

In some alternative implementations of the present embodiment, the dumping point determining unit is further configured to: in response to a direction of flipping a cover of the sorting robot being a left side, a route on a north side of the package drop opening being a one-way route to east, and a route on a south side of the package drop opening being a one-way route to west, perform at least one of the following operations: determining, a dumping point located on the south side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the north side of the target package drop opening in the two dumping points of the target package drop opening on the route perpendicular to the import direction of the import platform in the sorting map, as the target dumping point, if the target package drop opening is located in a second quadrant or a third quadrant of the import platform.

In some alternative implementations of the present embodiment, the apparatus further includes: an import platform determining unit, configured to determine, in response to the sorting robot completing the package drop task, an import platform for returning the sorting robot, randomly or according to numbers of respective sorting robots belonging to import platforms; a temporary storage position determining unit, configured to determine an empty vehicle temporary storage position having a smallest Manhattan distance to the target package drop opening from empty vehicle temporary storage positions of the import platform for returning the sorting robot; a return route determining unit, configured to determine a preferred return route of predetermined to-be-selected return routes from the target package drop opening to the empty vehicle temporary storage position having the smallest Manhattan distance; and a return route sending unit, configured to send an empty vehicle temporary storage task including the preferred return route, to the sorting robot.

In some alternative implementations of the present embodiment, the apparatus further includes: a charging determining unit, configured to determine whether the sorting robot needs to be charged, in response to the sorting robot reaching the empty vehicle temporary storage position; a charging task sending unit, configured to, if the sorting robot needs to be charged, send a charging task including a charging station position to the sorting robot; and a queuing task sending unit, configured to, if the sorting robot does not need to be charged, send a queuing task including a queuing temporary storage position to the sorting robot.

In some alternative implementations of the present embodiment, the queuing temporary storage position sent by the queuing task sending unit is an idle queuing temporary storage position that is closest to the import platform to which the empty vehicle temporary storage position belongs.

In some alternative implementations of the present embodiment, the idle queuing temporary storage position that is closest to the import platform to which the empty vehicle temporary storage position belongs sent by the queuing task sending unit is determined by the following steps: traversing, from near to far based on a distance to the import platform to which the empty vehicle temporary storage position belongs, columns of queuing temporary storage positions until a column having the idle queuing temporary storage position is found; and determining, from the column having the idle queuing temporary storage position, an idle queuing temporary storage position closest to the import platform to which the empty vehicle temporary storage position belongs, as the idle queuing temporary storage position that is closest to the import platform to which the empty vehicle temporary storage position belongs.

In some alternative implementations of the present embodiment, the apparatus further includes: a first overall translation instruction sending unit, configured to send, in response to no sorting robot being located in a queue of queuing buffering positions adjoining the import platform, a first overall translation instruction to a sorting robot in a queue of queuing temporary storage positions that is closest to the queue of queuing buffering positions adjoining the import platform, and translate the sorting robot in the queue of queuing temporary storage positions that is closest to the queue of queuing buffering positions adjoining the import platform to the queue of queuing buffering positions adjoining the import platform.

In some alternative implementations of the present embodiment, the apparatus further includes: a second overall translation instruction sending unit, configured to determine whether a current queue of queuing temporary storage positions does not have a sorting robot, from near to far based on a distance to the queue of queuing buffering positions, and if the current queue of queuing temporary storage positions does not have the sorting robot, send a second overall translation instruction to a sorting robot in queuing temporary storage positions of a queue next to the current queue, and translate the sorting robot in queuing temporary storage positions of the next queue, to the current queue of queuing temporary storage positions.

In some alternative implementations of the present embodiment, the apparatus further includes: an import platform traveling triggering unit, configured to, in response to the sorting robot located on the import platform leaving for responding to the package drop task, trigger a sorting robot located in a first position of a queue of queuing buffering positions to travel to the import platform.

In some alternative implementations of the present embodiment, the apparatus further includes: a route optimization determining unit, configured to optimize the apparatus for determining a driving route of a sorting robot according to one or more of the following indicators: a total sorting time length, an import platform usage rate, and a total running time length of the sorting robot.

The present disclosure further provides an embodiment of an apparatus, including: one or more processors; a memory, for storing one or more programs; and the one or more programs, when executed by the one or more processors, cause the one or more processors to implement the method for determining a driving route of a sorting robot according to any one of the embodiments.

The present disclosure further provides an embodiment of a computer readable storage medium, storing a computer program thereon, the program, when executed by a processor, implements the method for determining a driving route of a sorting robot according to any one of the embodiments.

It should be understood that for the directions in the map described in the embodiments of the present disclosure, top is north, bottom is south, left is south, and right is east, which are merely exemplary directions for illustrating the interrelationship between points and/or routes and do not represent a limitation of the map. For example, the user may alternatively set the east, south, west, and north directions in the map according to the using habits, and use the interrelationship between the points and/or routes in the present disclosure to perform the method and apparatus for determining a driving route of a sorting robot of the embodiments of the present disclosure.

In the above embodiments of the present disclosure, the first overall translation instruction and the second overall translation instruction only represent two overall translation instructions having different response conditions and different subjects for receiving the instructions. The response condition of the first overall translation instruction is that no sorting robot being located in a queue of queuing buffering positions adjoining the import platform, and the subject for receiving the instruction is a sorting robot in a queue of queuing temporary storage positions that is closest to the queue of queuing buffering positions adjoining the import platform. The response condition of the second overall translation instruction is that the current queue of queuing temporary storage positions does not have the sorting robot, and the subject for receiving the instruction is a sorting robot in queuing temporary storage positions of a queue next to the current queue. Those skilled in the art will appreciate that the first or second therein does not constitute a particular definition of the overall translation instruction.

Similarly, in the above embodiments of the present disclosure, the first translation instruction sending unit and the second translation instruction sending unit only represent two sending units that send different translation instructions, where the first translation instruction sending unit is configured to send the first overall translation instruction, and the second translation instruction sending unit is configured to send the second overall translation instruction. Those skilled in the art will appreciate that the first or second therein does not constitute a particular definition of the translation instruction sending unit.

Figure 5:
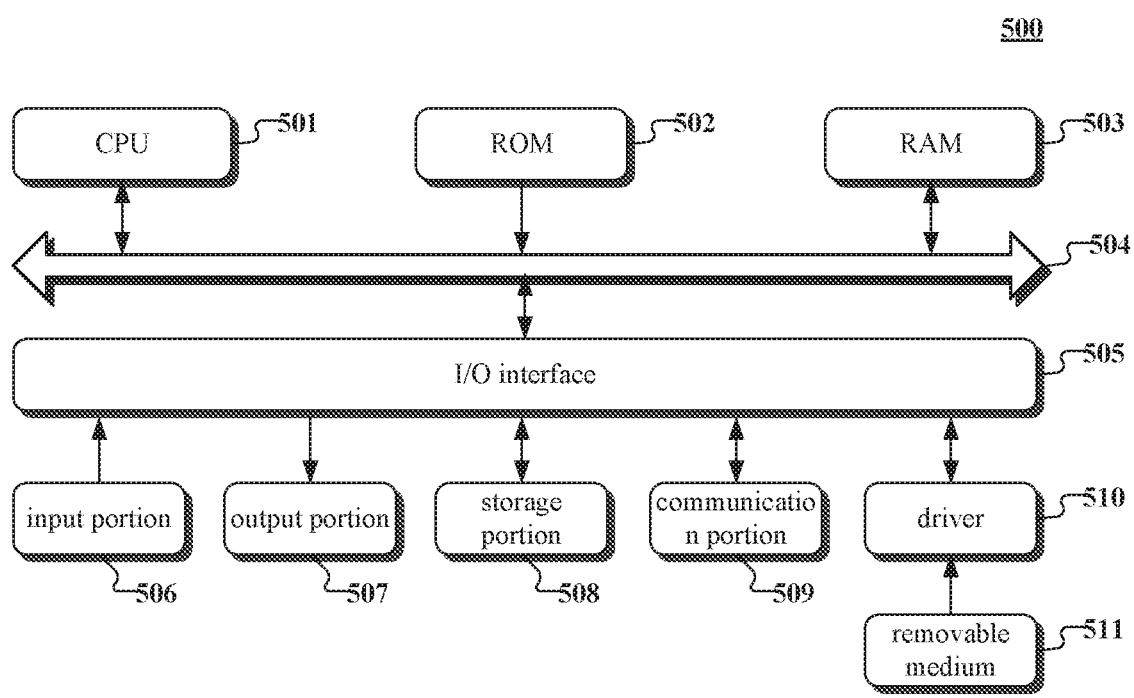
FIG. 5 is a schematic structural diagram of a computer system adapted to implement a terminal device or a server of the embodiments of the present disclosure.

With further reference to FIG. 5, a schematic structural diagram of a computer system 500 adapted to implement a terminal device or a server of the embodiments of the present disclosure is shown. The terminal device shown in FIG. 5 is merely an example, and should not impose any limitation on the function and scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components may be connected to the I/O interface 505: an input portion 506 including such as a keyboard, a mouse; an output portion 507 including such as a cathode ray tube (CRT), a liquid crystal display device (LCD), a speaker, etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 509, and/or may be installed from the removable medium 511. The computer program, when executed by the central processing unit (CPU) 501, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an destination determining unit, a package drop opening determining unit, a dumping point identification unit, a route cost calculation unit, a dumping point determining unit, a package drop route determining unit, and a package drop route sending unit. Here, the names of these units do not in some cases constitute limitations to such units themselves. For example, the destination determining unit may also be described as "a unit configured to determine, in response to weighting and scanning for the sorting robot on an import platform, a destination of the sorting robot in a sorting map".

The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: determine, in response to weighting and scanning for the sorting robot on an import platform, a destination of the sorting robot in a sorting map; determine, according to the destination, a target package drop opening in the sorting map; identify two dumping points on a route perpendicular to an import direction of the import platform from dumping points of the target package drop opening; calculate respective route costs of routes from the import platform to the two dumping points; determine a dumping point corresponding to the smaller route cost as a target dumping point in the sorting map; determine a preferred package drop route among predetermined to-be-selected package drop routes from the import platform to the target dumping point; and send a package drop task including the preferred package drop route to the sorting robot.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for determining a driving route of a sorting robot, the method comprising:
   determining, in response to weighting and scanning for the sorting robot on an import platform, a destination of the sorting robot in a sorting map;
   determining, according to the destination, a target package drop opening in the sorting map;
   identifying two dumping points on a route perpendicular to an import direction of the import platform from dumping points of the target package drop opening;
   calculating respective route costs of routes from the import platform to the two dumping points;
   determining a dumping point corresponding to the smaller route cost from the two dumping points as a target dumping point in the sorting map;
   determining a preferred package drop route among predetermined to-be-selected package drop routes from the import platform to the target dumping point; and
   sending a package drop task comprising the preferred package drop route to the sorting robot.

2. The method according to claim 1, wherein the calculating respective route costs of routes from the import platform to the two dumping points comprises:
   dividing each driving node of the sorting robot in the sorting map into four direction points including one east point, one south point, one west point and one north point in a turning map;
   using one-way edges to connect the east point to the south point, the east point to the north point, the south point to the east point, the south point to the west point, the west point to the south point, the west point to the north point, the north point to the east point and the north point to the west point, respectively, for the four direction points;
   establishing, corresponding to an original route between two adjacent driving nodes in the sorting map, a new route using a one-way edge connection in the turning map; and
   calculating the route costs of the routes from the import platform to the two dumping points, respectively, based on a preset cost of the one-way edge and routes from the import platform to the two dumping points of the sorting robot in the turning map.

3. The method according to claim 1, wherein the determining a dumping point corresponding to the smaller route cost as a target dumping point in the sorting map comprises:
   in response to a direction of flipping a cover of the sorting robot being a right side, a route on a north side of the package drop opening being a one-way route to east, and a route on a south side of the package drop opening being a one-way route to west, performing at least one of following operations:
   determining, a dumping point located on the north side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or
   determining, a dumping point located on the south side of the target package drop opening in the two dumping points of the target package drop opening on the route perpendicular to the import direction of the import platform in the sorting map, as the target dumping point, if the target package drop opening is located in a second quadrant or a third quadrant of the import platform.

4. The method according to claim 1, wherein the determining a dumping point corresponding to the smaller route cost as a target dumping point in the sorting map comprises:
   in response to a direction of flipping a cover of the sorting robot being a left side, a route on a north side of the package drop opening being a one-way route to east, and a route on a south side of the package drop opening being a one-way route to west, performing at least one of following operations:
   determining, a dumping point located on the south side of the target package drop opening in the two dumping points of the target package drop opening on the route perpendicular to the import direction of the import platform in the sorting map, as the target dumping point, if the target package drop opening is located in a first quadrant or a fourth quadrant of the import platform; and
   determining, a dumping point located on the north side of the target package drop opening in the two dumping points of the target package drop opening on the route perpendicular to the import direction of the import platform in the sorting map, as the target dumping point, if the target package drop opening is located in a second quadrant or a third quadrant of the import platform.

5. The method according to claim 1, wherein the method further comprises:
   determining, in response to the sorting robot completing the package drop task, an import platform for returning the sorting robot, randomly or according to numbers of respective sorting robots belonging to import platforms;

determining an empty vehicle temporary storage position having a smallest Manhattan distance to the target package drop opening from empty vehicle temporary storage positions of the import platform for returning the sorting robot; and determining a preferred return route of predetermined to-be-selected return routes from the target package drop opening to the empty vehicle temporary storage position having the smallest Manhattan distance; and sending an empty vehicle temporary storage task comprising the preferred return route, to the sorting robot.

6. The method according to claim 5, wherein the method further comprises:

determining whether the sorting robot needs to be charged, in response to the sorting robot reaching the empty vehicle temporary storage position;

if the sorting robot needs to be charged, sending a charging task comprising a charging station position to the sorting robot; and if the sorting robot does not need to be charged, sending a queuing task comprising a queuing temporary storage position to the sorting robot.

7. The method according to claim 6, wherein the queuing temporary storage position is an idle queuing temporary storage position that is closest to the import platform to which the empty vehicle temporary storage position belongs.

8. The method according to claim 7, wherein the idle queuing temporary storage position that is closest to the import platform to which the empty vehicle temporary storage position belongs is determined by:

traversing, from near to far based on a distance to the import platform to which the empty vehicle temporary storage position belongs, columns of queuing temporary storage positions until a column having the idle queuing temporary storage position is found; and determining, from the column having the idle queuing temporary storage position, an idle queuing temporary storage position closest to the import platform to which the empty vehicle temporary storage position belongs, as the idle queuing temporary storage position that is closest to the import platform to which the empty vehicle temporary storage position belongs.

9. The method according to claim 8, wherein the method further comprises:

sending, in response to no sorting robot being located in a queue of queuing buffering positions adjoining the import platform, a first overall translation instruction to a sorting robot in a queue of queuing temporary storage positions that is closest to the queue of queuing buffering positions adjoining the import platform, and translating the sorting robot in the queue of queuing temporary storage positions that is closest to the queue of queuing buffering positions adjoining the import platform to the queue of queuing buffering positions adjoining the import platform.

10. The method according to claim 9, wherein the method further comprises:

determining whether a current queue of queuing temporary storage positions does not have a sorting robot, from near to far based on a distance to the queue of queuing buffering positions, and if the current queue of queuing temporary storage positions does not have the sorting robot, sending a second overall translation instruction to a sorting robot in queuing temporary storage positions of a queue next to the current queue, and translating the sorting robot in queuing temporary storage positions of the next queue, to the current queue of queuing temporary storage positions.

11. The method according to claim 1, wherein the method further comprises:

in response to the sorting robot located on the import platform leaving for responding to the package drop task, triggering a sorting robot located in a first position of a queue of queuing buffering positions to travel to the import platform.

12. The method according to claim 1, wherein the method further comprises:

optimizing the method for determining a driving route of a sorting robot according to one or more indicators of: a total sorting time length, an import platform usage rate, and a total running time length of the sorting robot.

13. An apparatus for determining a driving route of a sorting robot, the apparatus comprising:

at least one processor; and a memory storing instructions, wherein the instructions when executed by the at least one processor, cause the at least one processor to perform operations, the operations comprising:

determining, in response to weighting and scanning for the sorting robot on an import platform, a destination of the sorting robot in a sorting map;

determining, according to the destination, a target package drop opening in the sorting map;

identifying two dumping points on a route perpendicular to an import direction of the import platform from dumping points of the target package drop opening;

calculating respective route costs of routes from the import platform to the two dumping points;

determining a dumping point corresponding to the smaller route cost from the two dumping points as a target dumping point in the sorting map;

determining a preferred package drop route among predetermined to-be-selected package drop routes from the import platform to the target dumping point; and sending a package drop task comprising the preferred package drop route to the sorting robot.

14. The apparatus according to claim 13, wherein the calculating respective route costs of routes from the import platform to the two dumping points comprises:

dividing each driving node of the sorting robot in the sorting map into four direction points including one east point, one south point, one west point and one north point in a turning map;

using one-way edges to connect the east point to the south point, the east point to the north point, the south point to the east point, the south point to the west point, the west point to the south point, the west point to the north point, the north point to the east point and the north point to the west point, respectively, for the four direction points;

establishing, corresponding to an original route between two adjacent driving nodes in the sorting map, a new route using a one-way edge connection in the turning map; and calculating the route costs of the routes from the import platform to the two dumping points, respectively, based on a preset cost of the one-way edge and routes from the import platform to the two dumping points of the sorting robot in the turning map.

15. The apparatus according to claim 13, wherein the determining a dumping point corresponding to the smaller route cost as a target dumping point in the sorting map comprises:

in response to a direction of flipping a cover of the sorting robot being a right side, a route on a north side of the package drop opening being a one-way route to east, and a route on a south side of the package drop opening being a one-way route to west, performing at least one of following operations:

determining, a dumping point located on the north side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the south side of the target package drop opening in the two dumping points of the target package drop opening on the route perpendicular to the import direction of the import platform in the sorting map, as the target dumping point, if the target package drop opening is located in a second quadrant or a third quadrant of the import platform.

16. The apparatus according to claim 13, wherein the determining a dumping point corresponding to the smaller route cost as a target dumping point in the sorting map comprises:

in response to a direction of flipping a cover of the sorting robot being a left side, a route on a north side of the package drop opening being a one-way route to east, and a route on a south side of the package drop opening being a one-way route to west, performing at least one of following operations:

determining, a dumping point located on the south side of the target package drop opening in the two dumping points of the target package drop opening on the route perpendicular to the import direction of the import platform in the sorting map, as the target dumping point, if the target package drop opening is located in a first quadrant or a fourth quadrant of the import platform; or determining, a dumping point located on the north side of the target package drop opening in the two dumping points of the target package drop opening on the route perpendicular to the import direction of the import platform in the sorting map, as the target dumping point, if the target package drop opening is located in a second quadrant or a third quadrant of the import platform.

17. The apparatus according to claim 13, wherein the operations further comprise:

determining, in response to the sorting robot completing the package drop task, an import platform for returning the sorting robot, randomly or according to numbers of respective sorting robots belonging to import platforms;

determining an empty vehicle temporary storage position having a smallest Manhattan distance to the target package drop opening from empty vehicle temporary storage positions of the import platform for returning the sorting robot;

determining a preferred return route of predetermined to-be-selected return routes from the target package drop opening to the empty vehicle temporary storage position having the smallest Manhattan distance; and sending an empty vehicle temporary storage task comprising the preferred return route, to the sorting robot.

18. The apparatus according to claim 17, wherein the operations further comprise:

determining whether the sorting robot needs to be charged, in response to the sorting robot reaching the empty vehicle temporary storage position;

if the sorting robot needs to be charged, sending a charging task comprising a charging station position to the sorting robot; and if the sorting robot does not need to be charged, sending a queuing task comprising a queuing temporary storage position to the sorting robot.

19. The apparatus according to claim 18, wherein the queuing temporary storage position is an idle queuing temporary storage position that is closest to the import platform to which the empty vehicle temporary storage position belongs.

20. A non-transitory computer readable storage medium, storing a computer program thereon, the program, when executed by a processor, causes the processor to perform operations, the operations comprising:

determining, in response to weighting and scanning for the sorting robot on an import platform, a destination of the sorting robot in a sorting map;

determining, according to the destination, a target package drop opening in the sorting map;

identifying two dumping points on a route perpendicular to an import direction of the import platform from dumping points of the target package drop opening;

calculating respective route costs of routes from the import platform to the two dumping points;

determining a dumping point corresponding to the smaller route cost from the two dumping points as a target dumping point in the sorting map;

determining a preferred package drop route among predetermined to-be-selected package drop routes from the import platform to the target dumping point; and sending a package drop task comprising the preferred package drop route to the sorting robot.

\* \* \* \* \*